United States Patent [19]

Schroer et al.

[11] Patent Number: 5,050,275
[45] Date of Patent: Sep. 24, 1991

[54] HOSE CLAMP

[75] Inventors: Bernt Schroer, Herzebrock; Ernst-Udo Ebert, Bad Sassendorf, both of Fed. Rep. of Germany

[73] Assignee: Markisches Federwerk GmbH & Co. KG, Ludenscheid, Fed. Rep. of Germany

[21] Appl. No.: 466,661

[22] Filed: Jan. 16, 1990

Related U.S. Application Data

[63] Continuation-in-part of Ser. No. 358,533, May 30, 1989, abandoned, which is a continuation of Ser. No. 186,172, Apr. 4, 1988, abandoned, which is a continuation-in-part of Ser. No. 38,058, Apr. 14, 1987, abandoned.

[30] Foreign Application Priority Data

Apr. 14, 1986 [DE] Fed. Rep. of Germany ....... 8610111
Aug. 7, 1989 [DE] Fed. Rep. of Germany ....... 8909472

[51] Int. Cl.⁵ ................................................ A44B 1/04
[52] U.S. Cl. ......................................... 24/283; 24/27; 24/279
[58] Field of Search ....... 24/19, 269, 274 R, 274 WB, 24/275, 279, 283, 284, 286, 282, 205, 27, 28, 29, 20L S; 358/533

[56] References Cited

U.S. PATENT DOCUMENTS

| 492,855 | 3/1893 | Weidaw . |
| 685,014 | 10/1901 | Thresher . |
| 1,432,572 | 10/1922 | Schroeder . |
| 2,582,093 | 1/1952 | Ayers . |
| 4,489,464 | 12/1984 | Massari et al. . |

FOREIGN PATENT DOCUMENTS

| 238851 | 6/1959 | Australia . |
| 527160 | 5/1931 | Fed. Rep. of Germany . |
| 8415973 | 11/1984 | Fed. Rep. of Germany . |
| 859349 | 6/1940 | France . |
| 1140775 | 3/1957 | France . |
| 1532461 | 5/1967 | France . |
| 1543373 | 9/1967 | France . |
| 2553154 | 4/1985 | France . |
| 2553155 | 4/1985 | France . |
| 610474 | 10/1948 | United Kingdom . |

Primary Examiner—Laurie K. Cranmer
Attorney, Agent, or Firm—Burns, Doane, Swecker & Mathis

[57] ABSTRACT

Hose clamps fashioned from wire have radially outwardly extending end portions which are connected to overlapping clamping member which is placed in compression when the hose clamp is tightened. In some embodiments the clamping member is a helically wound coil spring which may be integral with the wire or may be a separate element. In other embodiments, the clamping member is a screw-like member. Threads for receiving the screw may be integrally formed in the wire. Various connectins may be provided to attach the free end of the screw to the other end of the tightenable wire. For example, pins and cooperating holes may be for this purpose. If desired, multiple wire members can be serially connected to one another. And, the wire can be doubled on itself with a threaded lug or a hook being formed at the bent end. Coil springs and bights can be used to accommodate dimensional variations in the member being clamped. In addition, the screws can be designed so that there are one or more detent positions for each revolution of the screw.

21 Claims, 12 Drawing Sheets

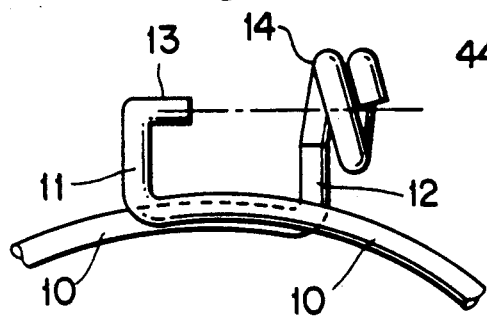
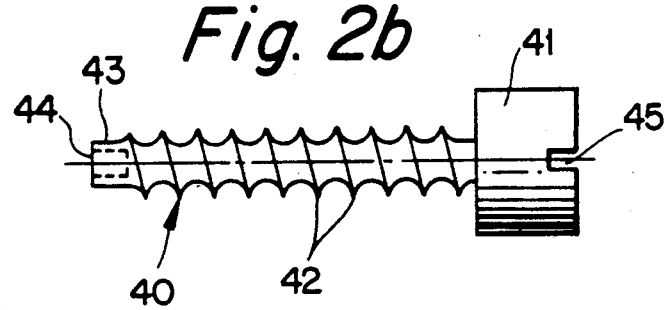
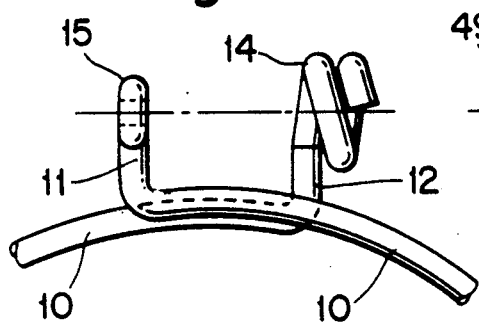
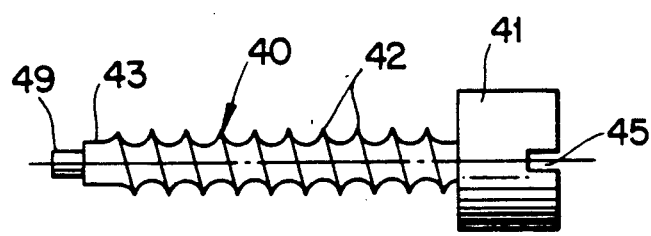
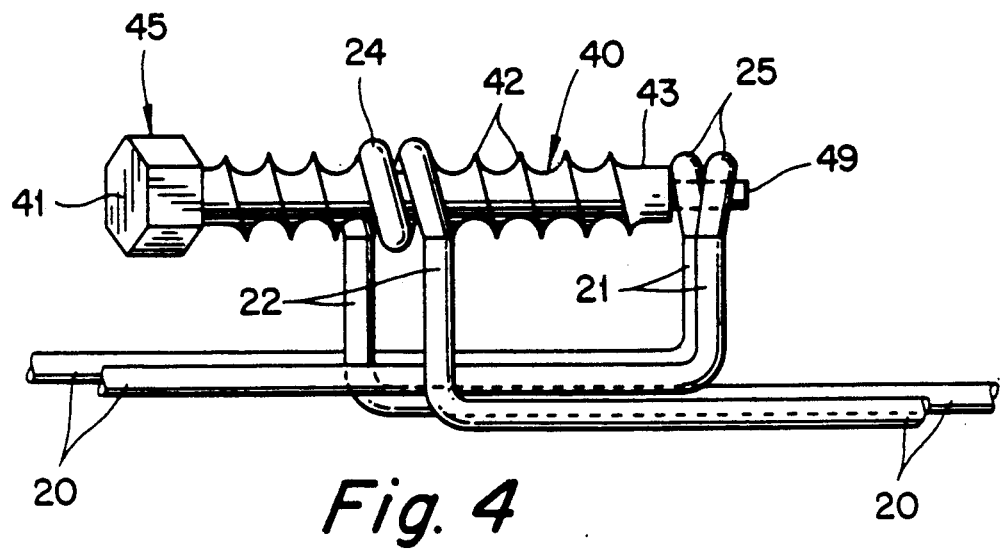

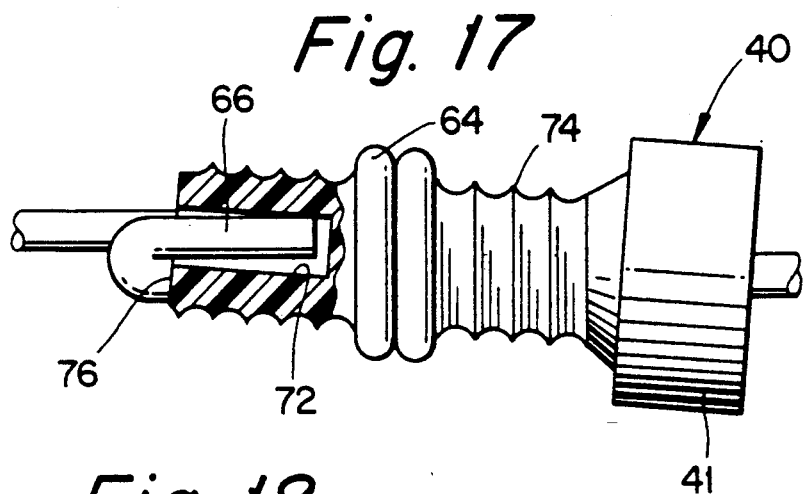
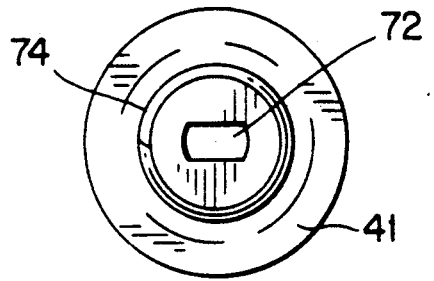
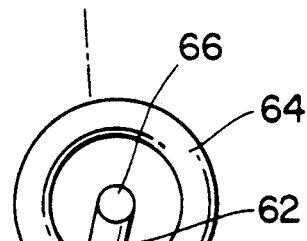
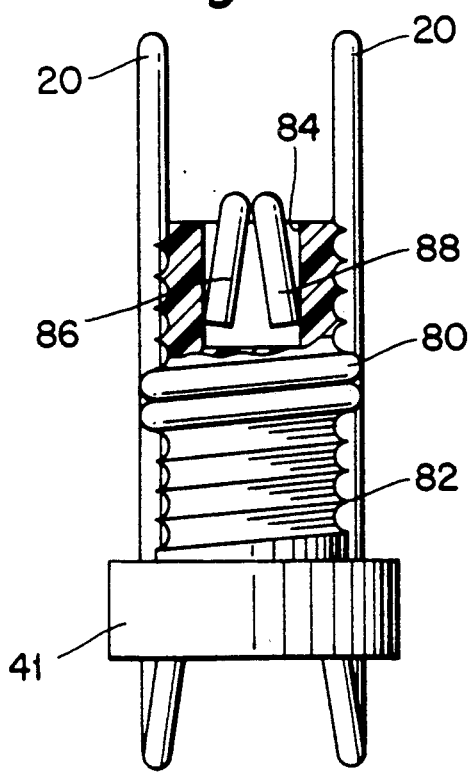
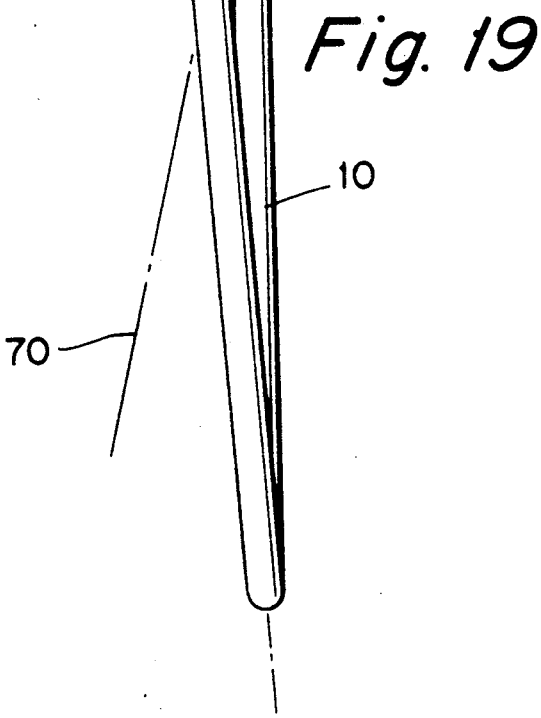

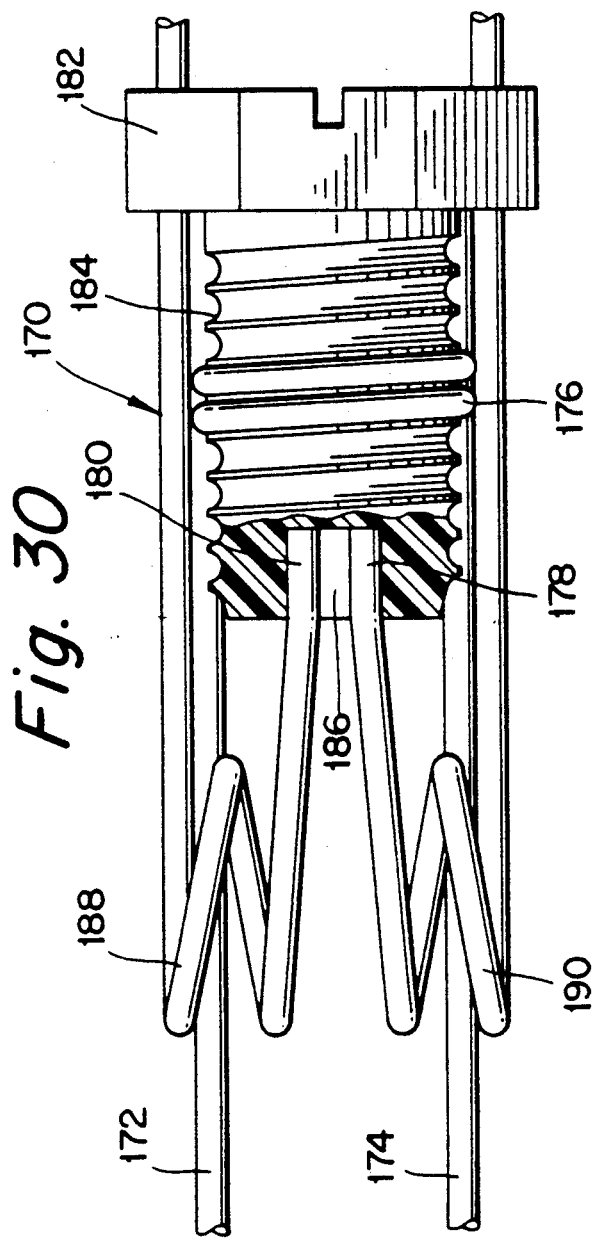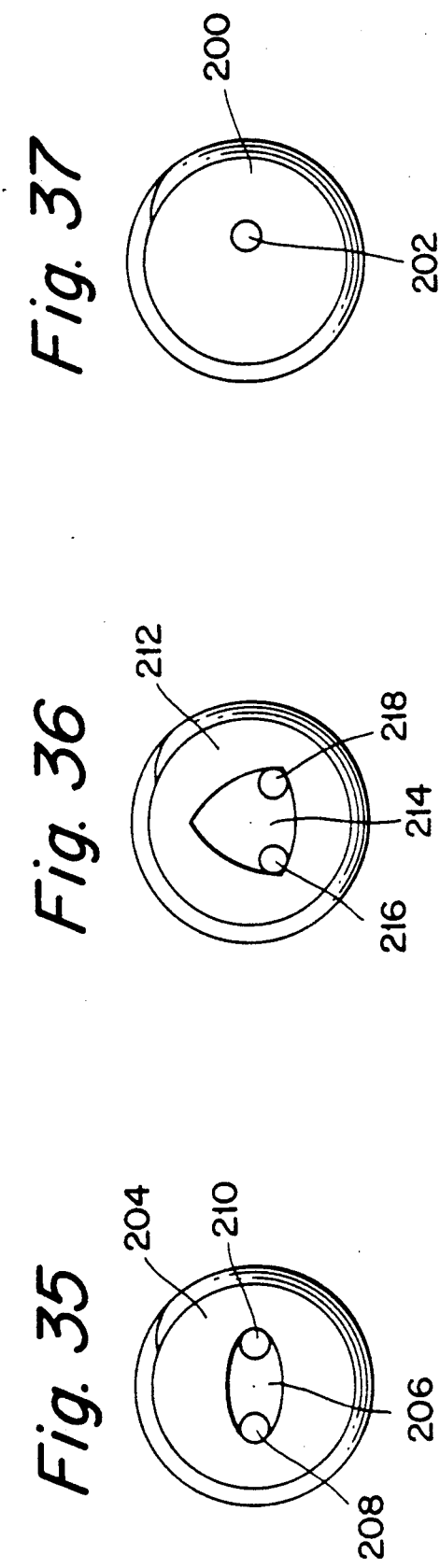

HOSE CLAMP

CROSS REFERENCE TO RELATED APPLICATIONS

This application is a continuation-in-part of U.S. patent application Ser. No. 358,533, filed on May 30, 1989 now abandoned; which is a continuation of U.S. patent application Ser. No. 186,172, filed on Apr. 4, 1988, now abandoned; which in turn is a continuation-in-part of U.S. patent application Ser. No. 038,058, filed on Apr. 14, 1987, now abandoned, claiming foreign priority based upon German patent application 86 10 111.0, filed Apr. 14, 1986.

BACKGROUND OF THE INVENTION

The invention concerns a hose clamp for fastening a hose received over a connecting piece, where the hose clamp has a tightening ring or band at least partially surrounding the hose and a clamping element cooperating with the ends of the tightening ring.

Hose clamps are used to fasten a hose to a hose nozzle, a connector fitting or the like. Hose clamps of this type are made, for example, of wire or strip material. Typically, the clamping element joins together the two ends of the wire or the strip in a manner such that the hose clamp may be tightened. Thus it is known to provide the strip material with toothing resembling a toothed rack and to provide a clamping element in the form of a screw. A screw of this type is generally received by a corresponding holder; it cooperates with the second end of the strip which resembles a toothed rack. The screw can be tightened (or released) by rotating the screw with a tool. Another proposal (DE-GM 84 15 973.1) describes a wire ring which only partially surrounds the connecting piece, and which is equipped with two lugs through which a screw is passed. The screw freely turns in one lug and cooperates with the other lug in the manner of a nut. The space between the two outwardly bent lugs is covered by a slide comprising corresponding portions on both sides. This slide is necessary to cover the space between the outwardly bend lugs so as to prevent introduction of folds as the hose is squeezed during its tightening. As a rule, such tightening rings can be mounted in the open state only and must be initially brought into a position for tightening after their application to the hose. This means that either the end of the strip must be threaded into a guide of the screw or the tightening screw must be fitted into the second lug serving as the nut. Furthermore, the manufacture of such hose clamps is expensive, as different single pieces must be made and in part further processed. The mounting of such hose clamps by automatic devices is generally impossible.

OBJECTS AND SUMMARY OF THE INVENTION

It is therefore an object of the invention to further develop these known hose clamps in a manner such that they will consist of the fewest possible number of parts, that they may be simply—even automatically—mounted, clamped, released and optionally opened, and that they may be produced easily and economically.

The foregoing as well as many other objects are attained by the invention by providing the tightening ring or band in the form of a wire clamping ring which surrounds the clamping location by more than 360° so that the clamping element is located between the ends of the wire tightening ring essentially parallel to their overlap. The tightening ring is in the form of a tensile member, with both ends comprising outwardly directed bends and at least one of the ends and the side of the clamping element associated with said end being releasably interconnected by means of a type of a plug connection. This configuration creates a hose clamp having a plug-in connection which is opened in a simple manner and which may be placed over the hose while in an open position and then closed without tightening. The risk of formation of folds in the hose in the closing area during the subsequent tightening by means of the clamping element is avoided by the overlap. The clamping element itself connects the free ends of the clamping ring and presses them apart. Accordingly, the circumferential length of the hose clamp is shortened by the overlap. In order to be able to simply open and close the hose clamp, it is advantageous to have the clamping element and the terminal piece cooperate to form a plug-in connection, with one side of the connection configured like a cup, lug or sleeve, into which the other side may be introduced as a pin or hook. Due to the compressive forces exerted by the clamping element, no other fastening is required. Such a hose clamp permits use of hardened spring steel wire for the clamping ring, whereby the outwardly directed bends are given the rigidity necessary to transfer forces to the circumferential portion of the tightening ring.

In one embodiment, the tightening ring may be a single wire clamping ring. In a second embodiment, the tightening ring may be a double wire tightening ring. In this manner a tightening ring is created that may be adapted to any prevailing condition at the clamping location relative to the hose and the hose fitting receiving the hose. The tightening rings are made essentially in a single piece and for this reason it is advantageous to select a suitable material by using a spring hardened material, i.e., spring wire. Here again spring wire possesses the requisite rigidity for the outwardly directed bends that is necessary for transmission of force to the circumferential portion.

In one preferred embodiment of the invention, the wire clamping ring is fashioned from a single piece of hard spring wire which lies in a plane with end portion of the clamping ring in overlying relationship to one another. One end portion of the clamping ring is formed into a screw-receiving lug of at least one and a half turns. The lug is radially disposed with respect to the center of the clamping ring and defines an axis which is substantially parallel to the plane of the clamping ring. The axis departs from parallelism by an angle which corresponds to the pitch of a screw that is threaded into the lug and is oriented in a direction such that the screw would push the second end portion against the first end portion. The second end portion of the clamping ring includes a part that is coiled to form a spring having a projecting end. The axis of the coiled spring is generally perpendicular to the plane of the ring while the projecting end is in general alignment with the axis of the screw-receiving lug. That coiled spring functions in torsion to urge the projecting end into engagement with the sidewall of a noncircular opening provided in the end of a screw which has been threaded into the screw-receiving lug. That engagement between the projecting end and the sidewall of the screw opening functions as a detent to resist loosening of the screw in the cooperating lug. Moreover, that coiled spring functions as a tensile spring to pull the second end portion of the clamping ring into side-by-side relationship with the first end portion of the clamping ring.

In another preferred embodiment of the invention, the wire clamping ring is fashioned from a single piece of hard spring wire and provided with a U-shaped hook at one end. The second end of the spring wire is formed into an outwardly bent screw-receiving lug, the turns of the spring wire being substantially perpendicular to a loop formed by the spring wire. A screw is provided which is received by the screw-receiving lug and which also has a noncircular opening located in the free end. That noncircular opening receives the free end of the U-shaped hook so as to create tension in the spring wire when the screw is advanced into the lug. In addition, the spring wire itself substantially defines a first plane while the U-shaped hook of the first end defines a second plane. The second plane is inclined relative to the first plane by an angle which corresponds to the pitch angle of the threaded lug. In this fashion, the free end of the hook end is positioned centrally with respect to the lug. As a result, when the screw advances into the lug, the screw is inclined relative to the first plane by an angle corresponding to the pitch angle. At the same time, the free end of the U-shaped end is received in the noncircular opening in the end of the screw and is positioned at an angle to the axis of the screw which corresponds to the pitch angle. Generally speaking, the pitch angle for screws of the type contemplated for this invention is about 5°.

Another preferred embodiment of the invention is characterized in that the clamping element, i.e., the compression member, is a helical spring wound in the form of a compression spring, where at least one end of the tightening band has the form of an outwardly bent hook that may be introduced into the compression spring. Here, according to another variant, the helically wound compression spring is molded onto the end of the tightening band facing the hook while forming a U-shape. The side accepting the hook of the helical spring extends essentially parallel to the tightening band and constitutes the open end of a U. Alternatively it is proposed to equip both ends of the tightening ring with hooks extending essentially parallel to the surface of the ring or band, the ends being capable of introduction into the helical spring from both sides. In these embodiments the compression member comprises a helical spring which, acting as a compression spring, forces the overlapping ends of the tightening band apart. The compression spring remains sufficiently compressed so that an adequate clamping forced is assured. In order to release the hose clamp, the spring must be further compressed, for example with a tool, to increase the diameter of the tightening band. In the case of the single piece, molded-on helical spring, only one hook is provided for the introduction and in this embodiment, therefore, only one opening location is present. Alternatively, the helical spring may be loose and the opening location of the tightening ring may be equipped with two bent hooks, both of which may be introduced into the open ends of the helical spring. Although in this embodiment the helical spring must be made as a separate piece, it offers considerable advantages, because different wire materials may be used for the tightening ring and the helical spring. In this manner the spring characteristic of the helical spring may be adapted to the desired or necessary conditions, while the wire of the tightening ring may be selected by different criteria.

A preferred embodiment comprises forming the tightening wire ring of at least two parts, where each of the parting locations of the tightening ring is overlapping and is equipped with a pressure member under compression forces, preferably in the form of a compression spring. By means of this embodiment, a hose clamp comprising at least two parts is obtained, the hose clamp being equipped with a plurality of tightening elements, with the number of parting locations being equal to the number of tightening elements. The path to be bridged by the tightening elements may be increased by raising the number of tightening elements. In addition, mounting is facilitated especially where prior application or "threading on" of the single part hose clamp is not possible. With clamping elements in the form of helical springs provided integrally on one side of each part, the number of individual parts to be mounted may be reduced.

A further preferred embodiment of the hose clamp comprises a clamping element in the form of a screw acting on both sides of the tightening ring, with one end of the tightening ring being an outwardly bent threaded lug receiving the screw, wound of the wire of the tightening ring and having at least 1½ turns. The other end of the tightening ring cooperates with the free end of said screw to form a plug-in connection. In this embodiment a "screw capability" of the tightening wire ring or double wire ring is obtained in a simple manner. The screw is provided with threads corresponding to the diameter of the wire of the threaded lug and the pitch of the threads is adapted to the wire shape. Alternatively, any screw that may be screwed into the threaded lug may perform the same function. It is particularly advantageous to wind the threaded lug as a helical spring with at least 1½ turns, with at least one of the leads of the winding being an extension of the wire or double wire ring. The helical spring formed in this manner cooperates as a lug with a screw the pitch of which is greater than the pitch of the helical spring in a self-limiting manner, as the helical spring is "stretched" by the turns of the screw. The degree of stretching and thus the self-limitation is determined by the difference between the pitch of the helical spring and the pitch of the screw; in general, it is considered that differences in pitch of 5 to 25% provide sufficient self-limitation.

A most preferred embodiment of the double wire device is fashioned by bending a hard spring wire to form a screw-receiving lug at about the middle portion thereof. The spring wire is then formed into two loops each of which lies in a corresponding plane, the planes containing the loops being substantially parallel and being spaced from one another by the screw-receiving lug. The turns of the screw-receiving lug are positioned so that the axis of the opening is substantially parallel to the planes containing the loops. Each end of the spring wire is formed into a U-shaped loop. The U-shaped loop at each end of the spring wire also defines a corresponding second plane which is inclined relative to the plane of the corresponding loop by an angle generally corresponding to the pitch angle of the screw. In addition these second planes converge toward the axis of the lug. A screw is provided which is received by the lug and which has a noncircular opening in the free end thereof. That noncircular opening receives the free ends of the U-shaped hooks with the free ends being disposed at an angle to the axis of the screw.

It is also proposed to shape the hair pin bend of the double wire tightening ring in the form of a threaded lug, wherein the two leads of the winding of the threaded lug constitute the wires of the tightening wire ring. In both cases, the threaded lug and the double wire tightening ring is a single integral piece of wire. In the case of a single wire ring the threaded lug is formed by one of the two ends. In the case of a double wire ring, the threaded lug is, advantageously, the U of the hair pin bend. It is especially advantageous in the aforedescribed integration of the threaded lug into the double wire ring that both wire rings are spaced apart, beginning at the threaded lug, by a distance corresponding to the diameter of the threaded lug. As the result, the overlap between ends of the tightening ring may be located in a manner such that both (a) the end of the double wire extending from the threaded lug and (b) the other ends of the double wire are resting on the circumference of the hose parallel to each other in the area of the overlap.

A configuration adapted to the screw shape of the plug-in closure is obtained by providing a free end of the screw with a bore that receives the free end or ends of the wire or double wire tightening rings. A further variant provides that the free end or ends of the wire or double wire tightening ring carries or carry at its or their outwardly bent end or ends a lug or double lugs, the inner diameter of which is smaller than the core diameter of the screw, which in turn is equipped with a pin to be inserted into the lug or the double lug. While the first embodiment uses the end bent in the shape of a hook of the helical spring tightening ring, the second embodiment attains a form of the plug-in closure free of hooks, with only threaded lugs and plug-in lugs being provided on the tightening ring. A screw cooperates with the threaded lug, said screw carrying at its free end a pin which is introduced in turn into the plug-in lug or lugs to form the plug-in connection. The end of the screw facing away from the plug-in joint is a configured end provided with a slit, a cross slit, external hexagon, internal hexagon, square, triangular configurations, or the like, shaped for the engagement of an appropriate tool. That is, the configured end is opposite to the free end of the screw which cooperates with the tightening ring in the manner of a plug-in closure, the free end carrying either a bore or a pin.

In a preferred embodiment in case of a double wire tightening ring, its free ends with their outwardly bent ends are provided with a counter stop having a cup shaped center contact pressure location. The diameter of the pressure location on the insertion side is at least equal to the external diameter of the screw equipped with a truncated conical end, preferably having a spherical tip. The sides of the counter stop are joined to the outwardly bent ends of the double wire tightening ring, preferably by rollover molding. Alternatively, a counter stop is proposed. The counter stop has a center hole, with the diameter of the hole being larger than the diameter of a pin integrally formed onto the screw. Sides of the counter stop are connected positively with the outwardly bent ends of the double wire tightening ring, preferably by rollover molding. In both embodiments beginning with the extended wire, a U-shape is initially bent and the U-bend is provided with the threaded lug. The counter stop, stamped of sheet metal and suitably shaped, is then pushed onto the free ends, with the lateral flaps of the stop being positively connected with the wire ends, for example by rollover molding. It is advantageous to compress the ends of the wire in a manner such that the positive joint is capable of resisting stress in the direction of the wire ends. This may be carried out by a slight beading such as might be accomplished by additional compression in the area of the beads during the rolling in of the lateral tabs of the counter stop. The slightly protruding wire ends can also be headed. Moreover, a supplemental welded joint is possible.

While in one embodiment the shaped end of the screw resembles a truncated cone that engages the cup shaped contact pressure area, thereby becoming self-centering. In another embodiment, a pin is introduced with sufficient clearance into the center hole of the counter stop. In the first case, forces are transmitted by the flanks of the truncated cone or the spherical end to the cup-shaped depression. In the second case, forces are transmitted by the step of the transition from the pin to the body of the screw, the transition abutting against the surface of the counter stop facing the screw. The shape of the cup may be adapted to the truncated cone form of the screw. In addition, hemispherical forms both of the screw end and of the receiving cup are also possible.

In order to obtain a satisfactory configuration of the overlap in the case of a double wire tightening ring made in a single piece, the two wire segments facing the ends of the U may be provided with offsets directed to the center between the two wires. The offsets are placed at the end of the U adjacent to each other without an appreciable spacing therebetween. The wire segments associated with the other end are placed spaced apart so that they extend adjacent to the inwardly offset ends and parallel to them. By this offsetting arrangement, the overlapping area is covered in a simple fashion, to prevent any undesirable squeezing of the hose to be clamped. The overlapping wire segments of the double wire tightening ring are located adjacent to each other, wherein as the result of the inwardly directed offset at one end, the wire segments of the other end of the U shaped tightening ring come to rest on the outside adjacent and parallel to the inwardly offset end.

The invention further includes a tightening ring with a single or double wire configuration having overlapping ends, with the overlapping ends being guided outwardly in an approximately radial direction and with a pressurizing clamping element being located between the ends. Compression springs or screws wound in the form of helical springs may be used as the clamping elements. Hooks, pins and bores, cups or lugs form the releasable plug-in connections between the clamping element and the tightening ring. The helical springs may be selected (particularly if they are not molded onto the tightening ring as an integral piece) in keeping with the tightening conditions and paths desired, wherein the length of the overlap also has an effect. While in the case of a double wire tightening ring, an orderly flow of force in the plane of the tightening ring is always assured by means of the configuration of the ends of the tightening ring in the area of the overlap, with single wire tightening rings this may be obtained simply by slightly staggering one or the other of the outwardly bent ends, so that the clamping element comes to rest in the plane of the tightening ring. As the screws are described as one form of compressively stressed clamping elements, it is possible to use plastic screws produced by injection molding and optionally reinforced by fibers or aluminum or zinc die castings. The tightening rings according to the invention may be manipulated and installed in view of their configuration without the risk of injury and they do not represent an appreciable source of injury in the installed state.

BRIEF DESCRIPTION OF THE DRAWINGS

The essence of the invention is made apparent in more detail below with reference to FIGS. 1 to 38, wherein like reference numerals are applied to like elements and wherein:

FIG. 2a is an enlarged view of the threaded lug and hook of FIG. 1;

FIG. 2b is an enlarged view of the screw of FIG. 1, the cooperation of a tightening ring with threaded lugs and hooks with the clamping element consisting of a screw can be appreciated from 2a and 2b;

FIG. 3a is an enlarged view of another embodiment of the threaded lug and hook ends of a tightening ring;

FIG. 3b is an enlarged view of a screw adapted to cooperate with the hook end of FIG. 3b;

FIG. 4 is an enlarged view of the connection between a double wire tightening ring having a threaded lug and a plug-in lug and a screw as the clamping element;

FIG. 17 is similar to FIG. 16 with portions broken away;

FIG. 18 is an end view of the screw used in FIG. 16;

FIG. 19 is a view taken along the line 19—19 of FIG. 15;

FIG. 20 is a view of a wire tightening ring using a double wire with portions broken away in the interest of clarity;

FIG. 30 is a top view of a clamping ring having two loops, each having a coil spring;

FIG. 35 is an end view of a screw for use with the clamping rings of the invention showing a two-lobe, transversely elongated opening;

FIG. 36 is an end view of a screw for use with the clamping rings of the invention showing a three-lobe opening;

FIG. 37 is an end view of a screw for use with the single-loop clamping rings of the invention showing an eccentrically positioned opening.

DETAILED DESCRIPTION OF THE PREFERRED EMBODIMENTS

Figure 1:
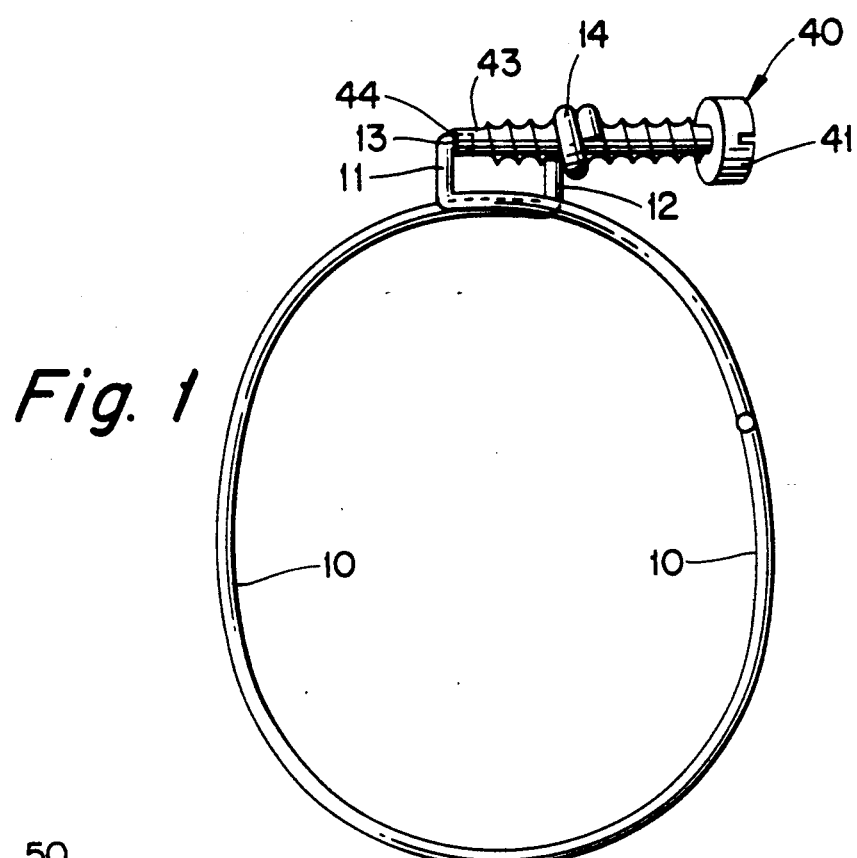
FIG. 1 shows a view of a wire tightening ring with a screw as the clamping element.

FIG. 1 depicts a wire tightening ring 10 with overlapping ends 11, 12 which are radially outwardly bent. The radially outwardly bent part 11 is equipped at its outer end with a hook 13 pointing approximately rearwardly in the circumferential direction. The other approximately radially outwardly bent end 12 of the wire tightening ring 10 has an integrally formed winding with 1½ turns. This winding forms a threaded lug 14 to receive a screw 40. The thread of the screw 40 is adapted to the diameter of the wire of the tightening ring 10. The pitch of the tightening ring may differ slightly from the pitch of the threaded lug 14 toward a greater pitch. In this manner an elastic deformation of the threaded lug and a limitation of the screw is obtained. The screw has a head 41 having a slit in this case to provide a hold for a tool. At the other, or free, end 43, the screw 40 has a bore 44 which is provided to be engaged by the hook 13. Details of this engagement are shown in FIGS. 2a and 2b, where the screw 40 is removed from the threaded lug 14 with the common axis being indicated by a dash-dot line. The configuration of the thread 42 is clearly seen; its pitch profile is adapted to conform to the cross section of the wire of which the threaded lug 14 is formed. Another embodiment of the cooperation between the ends of the wire ring 10 with the threaded screw 40 is shown in FIG. 3a and 3b. Here, the free end of the threaded screw 43 is provided with a pin 49 and in place of the hook 13. A plug-in sleeve 15 is molded or formed onto the slightly outwardly bent end 11 of the tightening ring 10. When screwed together, the windings of the threaded lug 14 engage the threads 42 and the pin 49 is introduced into the sleeve 15, whereby the tightening ring may be tightened by rotating the screw 40.

FIG. 4 shows an embodiment of the double wire tightening ring, wherein the free end has outwardly bent portions each of which is equipped with a plug-in sleeve so as to define a double plug-in sleeve 25. The screw 40 engages this double sleeve 25 with its center pin 49. This embodiment demonstrates the fact that the configuration of the threaded lug 24 with a distance between the ends 22 angled off approximately radially to the outside, is particularly favorable for the formation of the overlap, as the ends of the double wire tightening ring extending to the sleeve 25, may be located between them. The sleeve 25 is formed in a very simple manner by two terminal lugs, the free inner diameter of which permits the introduction of the pin 49.

Figure 5A:
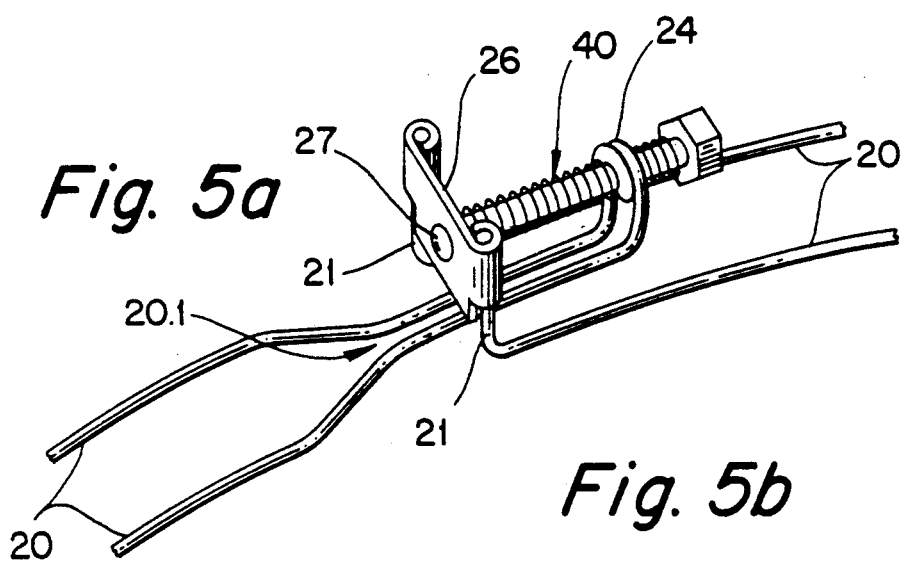
FIG. 5a is a detail view of the tightening ring with a counter stop and a screw as the clamping element.
Figure 5B:
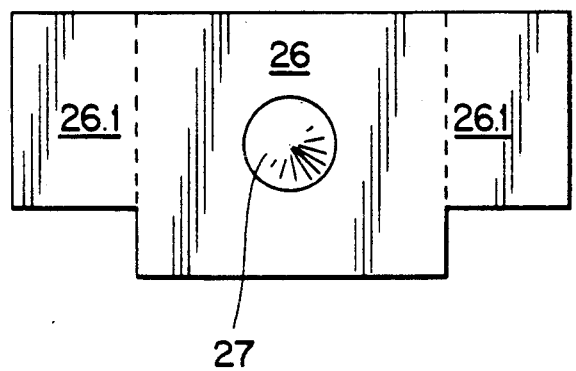
FIG. 5b is an enlarged view of the counter stop before application.
Figure 5C:
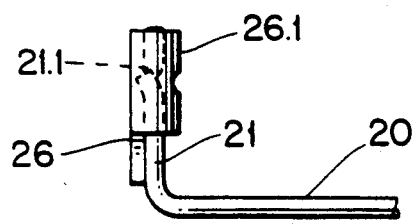
FIG. 5c is a side elevation of a counter stop attached to the tightening wire.
Figure 5D:
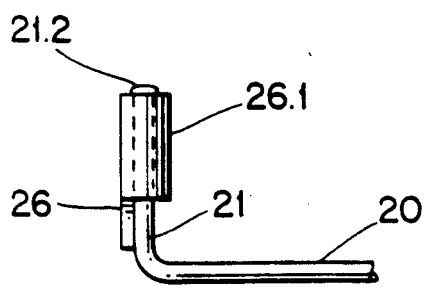
FIG. 5d is a side elevation of another embodiment of the counter stop attached to the tightening wire.

FIG. 5a shows an embodiment with a counter stop 26, having two lateral tabs 26.1 (FIG. 5b) rolled up onto the radially outward bent ends 21 of the free end of the double wire tightening ring 20. A planar development of the metal strip forming the counter stop is shown in a top elevation in FIG. 5b. The lateral tabs 26.1 are rolled around the radially outwardly bent ends of the double wire tightening ring according to FIGS. 5c and 5d. A bead 21.1 may be applied prior to or during the rolling process to further secure the tightening wire together with the counter stop. An upset or beaded head 21.2 of the (slightly) protruding end of the radially outwardly pointing wire 21 may be provided to retain the counter stop against being pulled off in the radially outward direction.

Figure 6A:
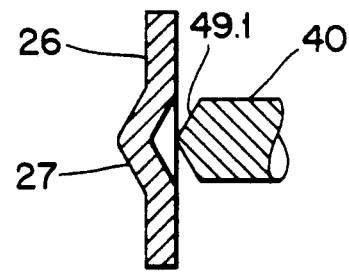
FIG. 6a is a cross-sectional view taken through a counter stop and a cup-shaped screw end.
Figure 6B:
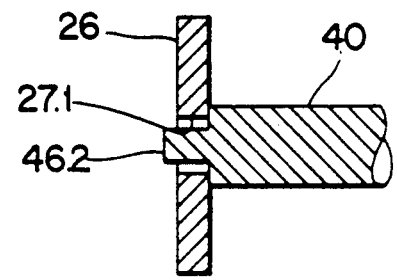
FIG. 6b is a cross-sectional view taken through a counter stop with a hole and a screw with a cooperating pin.
Figure 7:
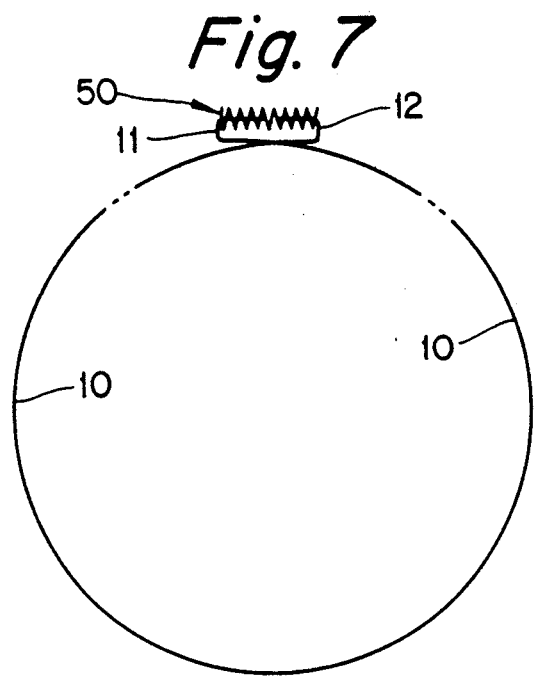
FIG. 7 is an elevation of a wire tightening ring with a single loose spring as the clamping element.

FIGS. 6a and 6b show the counter stop cooperating with the clamping screw in section. In FIG. 6a the counter stop is provided with a cup shaped contact area 27 as indicated. The screw 40 is equipped with a conical end 49.1 that engages the cup-shaped counter stop. The opening angle of the cup is approximately equal to the opening angle of the cone of the screw. In this case the flanks of the cone support one another, with the tip being advantageously spherical. If the opening angle of the cup 27 is made larger than the opening angle of the cone, the tip supports the screw in self-centering cooperation with the depression of the cup 27, even if the tip of the screw is spherical, or hemispherical. FIG. 6b shows a screw end which carries a pin 46.2, that is introduced into a hole 27.1 of the corresponding counter stop 26. The clearance between the hole 27.1 and the pin 46.2 prevents any undesirable self-limitation. This embodiment offers the advantage that the slightly protruding end of the pin 46.2 may be upset or peened, thereby securing the assembly.

FIGS. 7 to 10 show tightening rings equipped with helically wound springs as the clamping element. The wire tightening ring 10 is equipped, according to FIG. 7, with two outwardly bent ends 11 and 12, which in turn have hook like bends (not identified individually) for introduction into the compression spring 50 wound as a helical spring.

Figure 8:
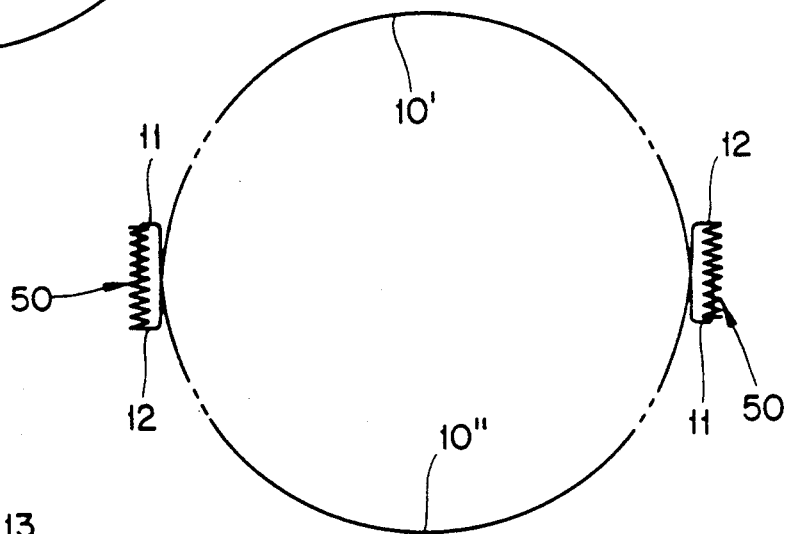
FIG. 8 is an elevation of a wire tightening ring in two sections, the ends of each section being connected with a loose spring as the clamping element.
Figure 9:
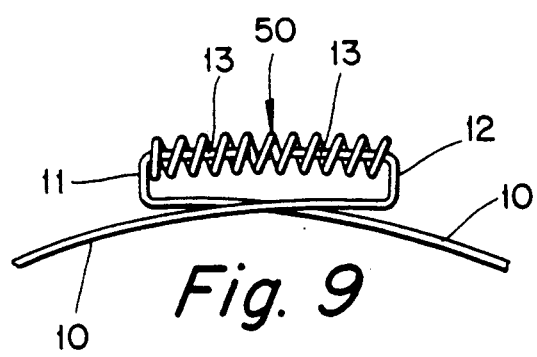
FIG. 9 is a detail view of a wire tightening ring with a loose spring as the clamping element.

In FIG. 8 the tightening ring 10 is in two parts, with each of the halves, 10' and 10", being equipped with outwardly angled ends 11 and 12, that are bent back in a hook like manner. Between the corresponding outward bends 11, 12 in this embodiment, a compression spring 50 wound as a helical spring is provided. This detail is shown enlarged in FIG. 9, which also illustrates the hook like extensions 13 introduced into the compression spring 50.

Figure 10:
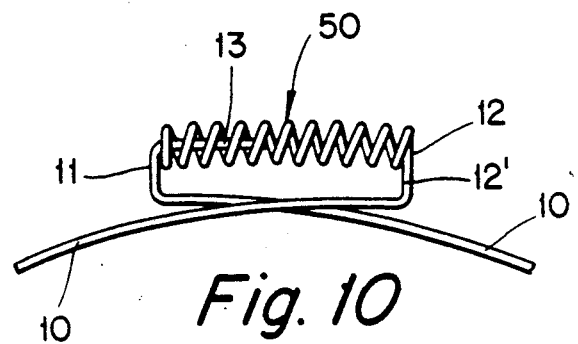
FIG. 10 is a detail view of a wire tightening ring with an integral spring.

In FIG. 10, the compression spring 50 is integrally connected or formed in a single piece with the outwardly bent wire part 12 at the end of the tightening ring 10. The other end of the tightening ring 10 is equipped with an outwardly directed bend 11, having the hook like extension 13 at the end thereof. The extension 13 is introduced into the compression spring 50 as shown.

Figure 11:
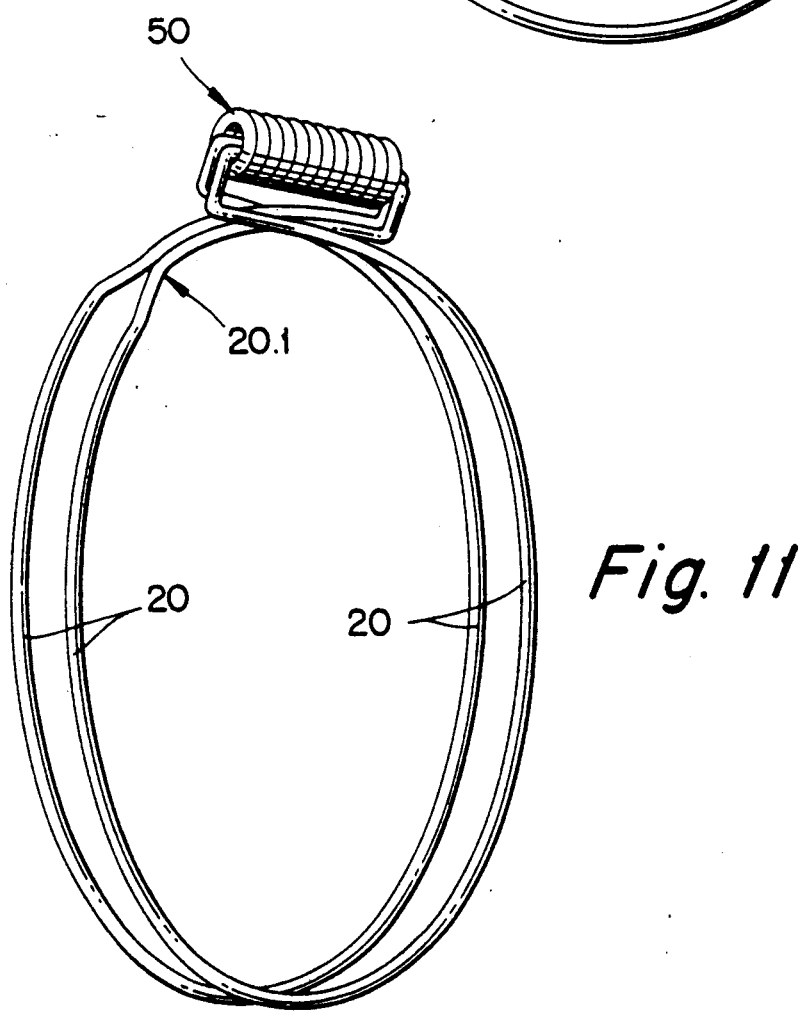
FIG. 11 is a perspective view of a double wire tightening ring with a loose spring as the clamping element.
Figure 12:
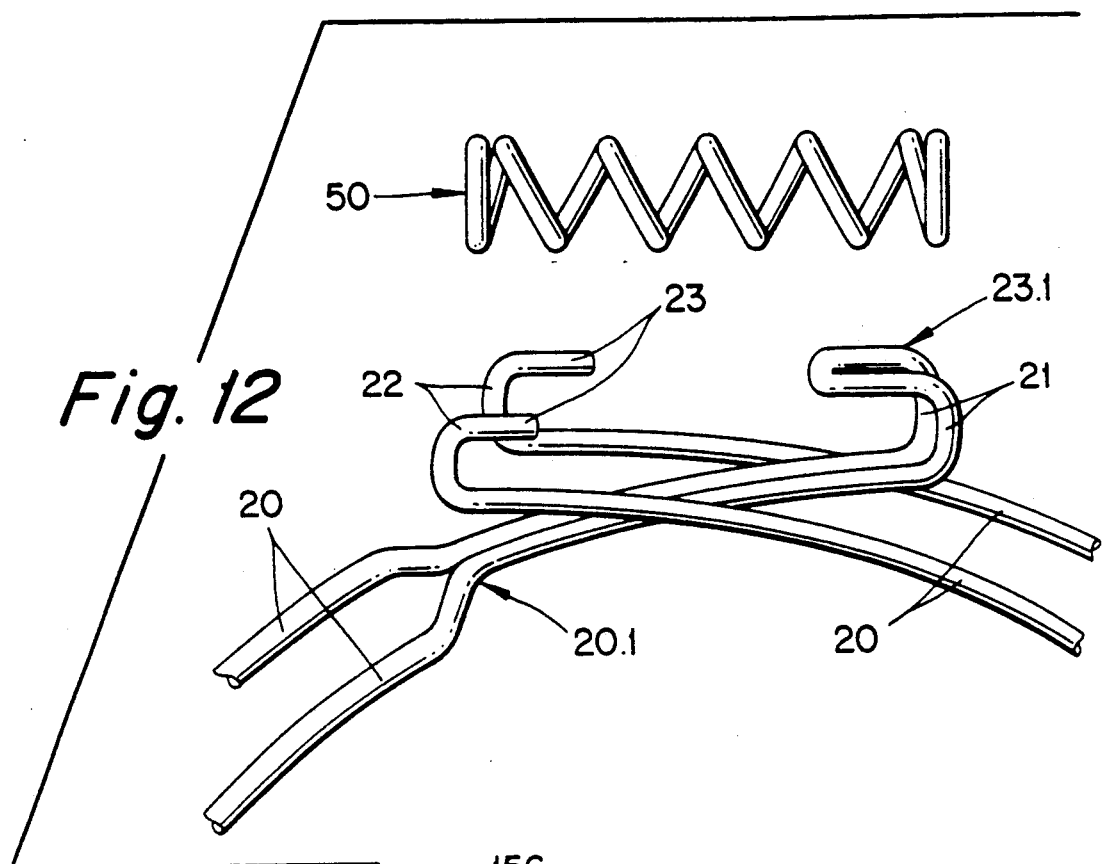
FIG. 12 is an exploded detail view of a double wire tightening ring with a hook and a free spring as the clamping element, one end of the tightening ring being offset.

FIGS. 11 and 12 show a special embodiment of the double ring tightening ring 20 formed from a wire section. The section of wire is bent in a shape of a U or of a hair pin. The two parallel and spaced apart wires of the double wire tightening ring 20 are provided with offsets 20.1 facing each other in the area of the tightening ring immediately adjacent to portions which will be in overlapping relationship when the hose clamp is applied. In this manner, the offsets 20.1 extend to the closed end of the U parallel to each other and without appreciable spacing therebetween. The two ends, both the closed and the open end of the U, are bent backwardly over themselves and are equipped with hook like ends 23 and 23.1. After being shaped into a ring, the ends 23, 23.1 are engaged by and tightened by the helical compression spring 50.

As the clamping elements are in the form of compression elements, the use of plastic screws is possible. These screws support the pressures applied by the tightening of the tightening ring as do aluminum or zinc screws produced by die casting.

Figure 13:
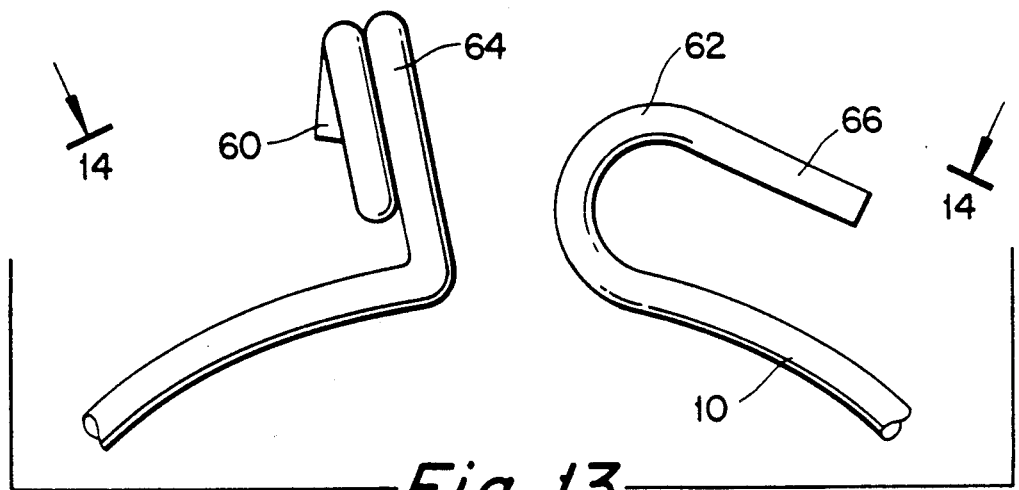
FIG. 13 is a detail view of a wire tightening ring similar to that of FIG. 1.
Figure 14:
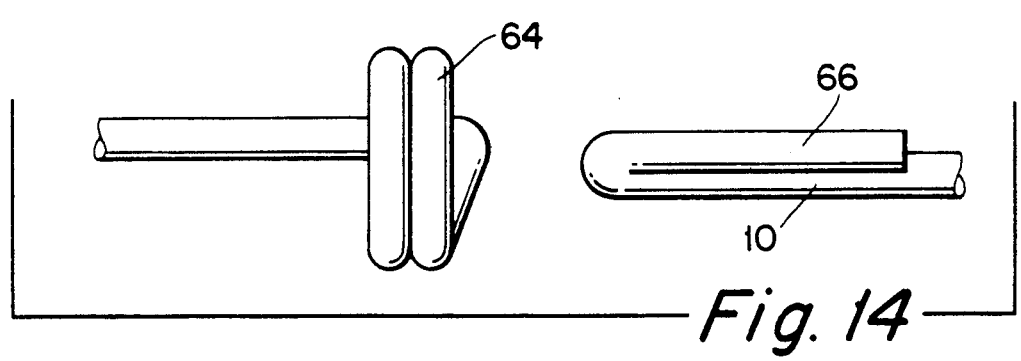
FIG. 14 is a view taken along the line 14—14 of FIG. 13.

With reference to FIG. 13, a most preferred embodiment of the single wire tightening ring 10 is illustrated. The wire 10 is fashioned from hard spring wire, is bent to approximate a circle, and includes a first end 60 and a second end 62. The first end 60 is bent generally radially outwardly and formed into a screw-receiving lug 64. The lug 64 includes at least 1½ turns so that a screw can be securely held. In addition, the turns of the lug 64 are oriented so as to be generally perpendicular to the plane in which the circular portion of the wire 10 is located (see FIG. 14).

Figure 15:
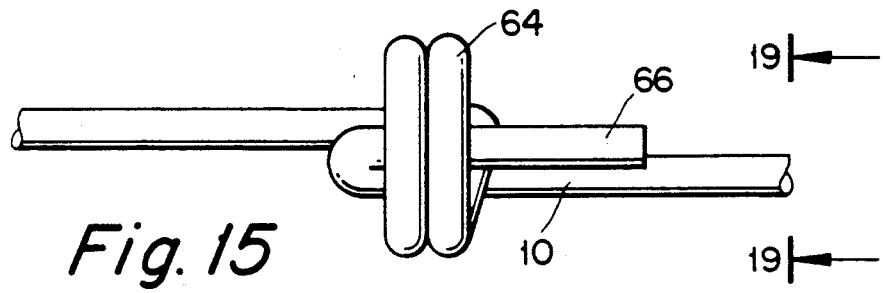
FIG. 15 is a detail of the wire tightening ring of FIG. 13 prior to insertion of a screw.

The second end 62 of the wire 10 has a U-shape (FIG. 13). At the very end of the wire, there is a substantially straight portion 66. Preferably, the straight portion 66 has a length of at least three times the diameter of the spring wire 10. As best seen in FIG. 19, the U-shaped end 62 defines a plane 70 which is inclined relative to the plane 68 which substantially includes the loop of the wire 10. The angle between the first plane 68 and the second plane 70 is small, on the order of the pitch angle of screwthreads defined by the lug 64. For example, angles on the order of 5 are suitable. When the wire 10 is prepared for use, the end portion 66 is disposed inside and extends through the lug 64 see FIG. 15). With the preferred angular relationship, the U-shaped end portion 62 is preferably centered along the lug 64.

Figure 16:
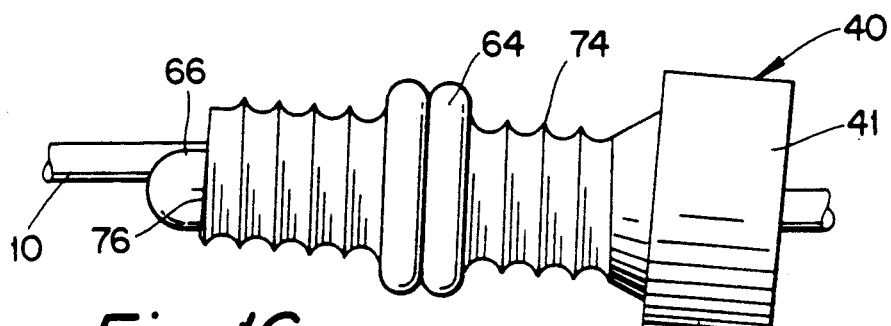
FIG. 16 is a view similar to FIG. 15 with the screw in place.

In use, (FIG. 16) a screw 41 having a head with any suitable conventional means for being driven, e.g., a slot, a hexagonal socket, a Phillips socket, etc., an external thread 74 with a pitch corresponding generally to the pitch of the lug 64, and a distal end 76, engages the free end 66 of the wire 10 and is inserted into the opening of the lug 64. The screw can be fashioned from any suitable conventional material, including plastic, aluminum, etc. As illustrated, the screw 41 assumes an angle relative to the plane of the wire 10 which corresponds generally to the pitch of the threaded lug 64. That relationship results from the generally perpendicular relationship between the turns of the lug 64 and the plane 68 of the loop 10. As the screw is advanced into the lug 64, the loop 10 is tightened and the desired clamping effect is obtained.

The free end 76 of the screw 41 is provided with an opening 72 (FIG. 17) which is noncircular in cross-sectional shape (FIG. 18). The opening 72 (FIG. 17) has a minimum transverse dimension which exceeds the diameter of the wire 10. In addition, the opening 72 has a length which is at least approximately coextensive with the length of the straight end portion 66. Due to the orientation between the axis of the screw 41 and the straight end portion 66, the very end of the end portion 66 can bear against the side wall of the opening 72. As a result of the noncircular cross section of the opening, the end portion 66 cooperates with the screw to provide a detent which resists turning of the screw 41 in the lug 64.

With reference now to FIG. 20, yet another specially preferred embodiment of the invention is illustrated in which a double tightening wire 20 is used. As with the embodiment of FIGS. 13-19, a screw 41 is provided. The screw 41 includes external threads 82 which conform to the pitch of a lug 80 provided in the wire 20. In addition, the screw 41 has a noncircular opening 84 in the free end of the screw with a minimum transverse dimension that is greater than the diameter of the wire 20. The opening 84 receives straight portions 86, 88 of U-shaped ends of the wire 20. Here again, the noncircular cross section of the opening 84 coupled with the inclination of the straight portions 86, 88, generate a detent which resists turning of the screw 41 in the lug 80.

Figure 21:
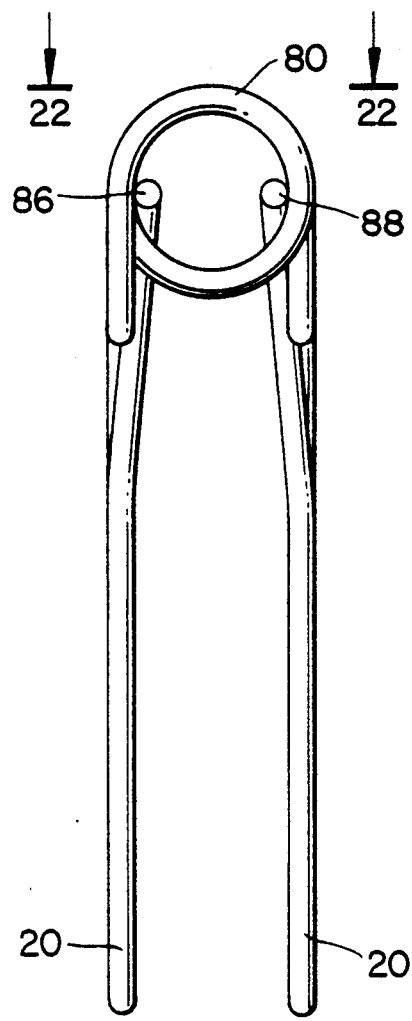
FIG. 21 is a view of the wire of FIG. 20.
Figure 22:
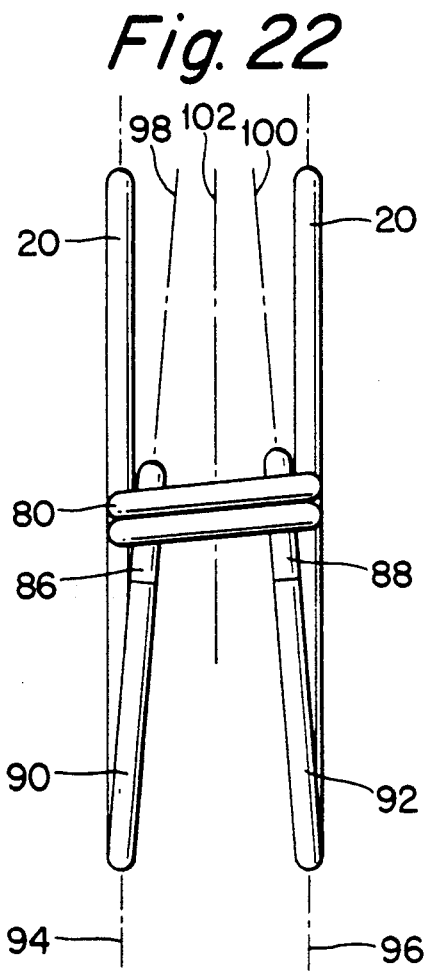
FIG. 22 is a view taken along the line 22—22 of FIG. 21.

The lug 80 (see FIG. 21) is generally circular and is formed at the middle of a single length of wire by suitably bending the wire. The lug 80 includes at least 1½ turns of the wire so that the screw 41 can be securely held. The wire of the tightener 20 is then formed to make two generally circular loops, each of which lies in a corresponding plane 94, 96 (see FIG. 22). The planes containing the loops are generally parallel and are spaced by the lug 80. The turns of the lug 80 are oriented so that the axis 102 of the lug is generally parallel to the planes 94, 96. In addition, the lug 80 is bent to project generally radially from the loops of the tightener, as is the lug 64 of FIG. 13.

Each end 86, 88 of the wire is fashioned as a U-shaped element, analogous to the U-shaped ends 66 of FIG. 13. Each end has a straight portion 90, 92 which is at least three wire diameters in length. Additionally, each straight portion 90, 92 is part of a corresponding end portion 90, 92. The U-shaped ends of the portions 90, 92 cooperate to define corresponding end planes 98, 100. These end planes 98, 100 are inclined relative to the plane of the corresponding loop, i.e., 94, 96, and are oriented so that they converge toward the axis 102 of the lug 80. The angle between the planes 98, 100 of the ends and the planes 94, 96 of the loops is small, on the order of the pitch angle of the lug 80. As a result, the straight ends of the lugs 86, 88 are located within the threaded lug 80 (see FIG. 21).

The operation and use of this embodiment is substantially the same as described above for the single loop embodiment.

Figure 23:
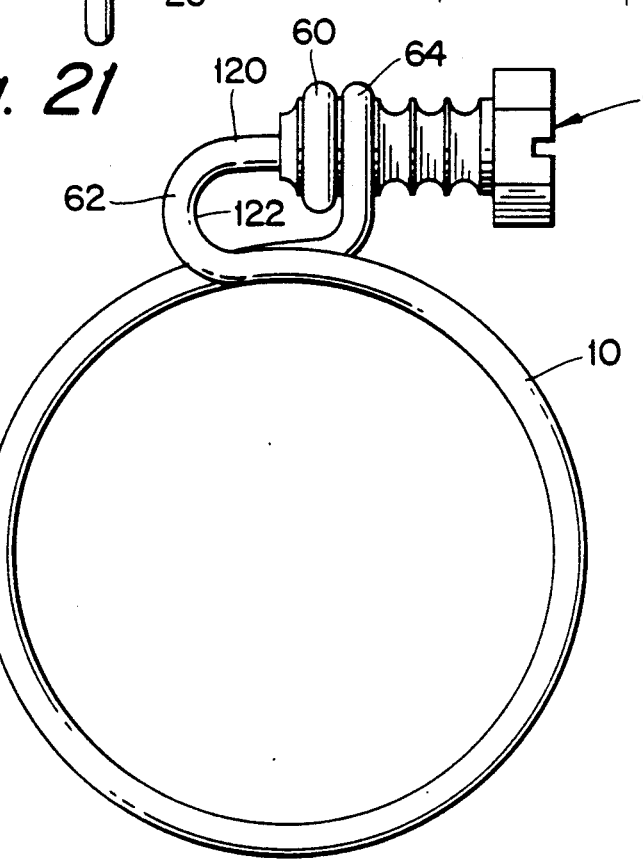
FIG. 23 is a clamping ring similar to the clamping ring of FIG. 13 in which the U-shaped end is lengthened so as to present torsional resilience to the projecting end.

Turning now to FIG. 23, a clamping ring 10 is shown which is similar to that shown in FIG. 13. There is, however, a significant difference between the embodiment of FIG. 23 and the embodiment of FIG. 13: in FIG. 23 the second end 62 of the hard spring wire is bent so as to form an elongated straight portion 120 which is engaged by the screw 40. This arrangement provides a generally U-shaped bight 122 in the second end 62 of the wire 10. When the other end 60 of the wire 10 is formed into a screw-receiving lug 64 with at least one and a half turns of wire, and when the axis of that lug 64 is directed so as to be at least slightly inclined relative to the plane of the wire loop, in a direction to pull the overlapping portions of the wire together, the presence of the bight 122 provides a substantial advantage.

More particularly, the direction of the axis of the lug 64 in cooperation with the extended length of the straight portion 120, tends to pull the second end 62 of the screw toward a position farther beyond the plane of the wire ring 10 than in the embodiment of FIG. 13. In addition, the presence of the bight 122 allows the clamping ring to accommodate some variations in the dimensions of the member being clamped. Such dimensional variations can be caused, for example, by manufacturing tolerances, thermal variations in the member being clamped, and the like.

It should also be noted that the embodiment of FIG. 23 resists forces that tend to twist the loop open, i.e., to displace the two ends 60, 62 of the wire laterally away from side to side contact with one another. That resistance is accomplished by the fact that the axis of the screw in combination with the elongation of the end 120 give rise to a resilient force that opposes forces that tend to twist the loop open.

Figure 24:
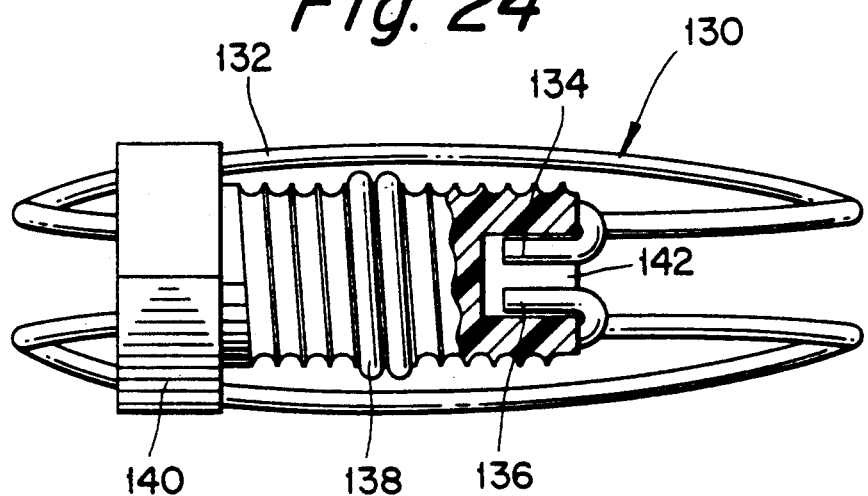
FIG. 24 is another embodiment of the double loop clamping ring where the loops themselves are twisted slightly so as to bias the hook ends away from the center of the screw-receiving lug.

In the embodiment of FIG. 24, another embodiment of a double wire clamp 130 is shown. Here, the clamp 130 is formed from a hard spring wire such that a screw receiving lug 138 with at least one and a half turns is formed at the middle of the length of the wire. In addition, the wire is formed such that each of the two ends 134, 136 is bent to form a hook. These ends 134, 136 of the wire engage a screw 140 having external threads with a pitch corresponding to the pitch of the lug 138. More specifically, the ends of the wire are received in a recess 142 provided at the threaded end of the screw 140.

Figure 25:
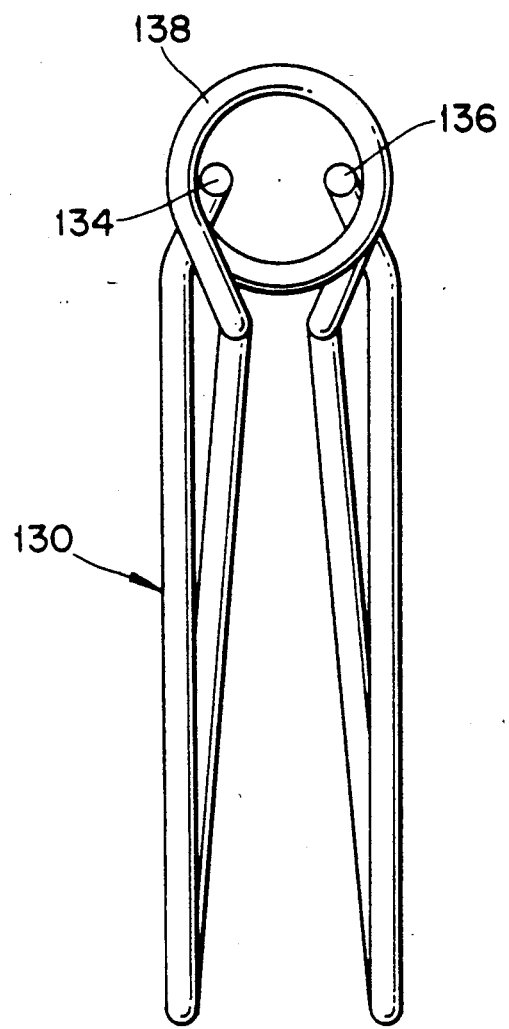
FIG. 25 is a left elevation of the clamping ring of FIG. 24 with the screw removed.
Figure 26:
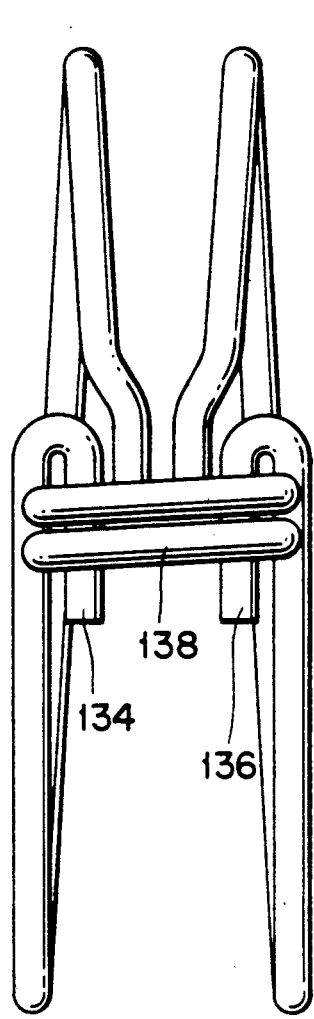
FIG. 26 is a top view of the clamping ring of FIG. 25 with the screw removed.

As can be seen from FIG. 25, a loop is formed by each side of the wire. These loops are twisted so that the corresponding ends 134, 136 are urged away from the centerline or axis of the screw receiving lug 138. To increase the resilient force that will act to urge the ends 134, 136 away from that axis, and to allow sufficient room for the ends 134, 136 to be displaced radially inwardly of the lug 138 to be received in the recess 142 of the screw 140, the portion of the wire which forms a U-shaped bend adjacent the corresponding ends 134, 136 may be slightly bent itself. This bend is best seen by comparing FIG. 25 and FIG. 26.

When the clamping ring 130 (see FIG. 24) is connected to a device, the ends 134, 136 engage the recess 142 of the screw 140. By virtue of the twist in the loops of the wire between the lug 138 and the hooked ends 134, 136, there is a resilience which pulls the ends 134, 136 away from the centerline or axis of the screw 140 and away from the centerline of the recess 142. By providing the recess with a non-circular cross section, the ends 134, 136 of the wire engage the radially outermost portions of the recess. Thus, when the screw 140 is rotated, the resiliency of the loops, in cooperation with the hook-shaped ends 134, 136, creates a detent that resists screw rotation. That detent also serves to hold the screw at a particular rotational position so as to preserve the tightness of the clamping ring when it is applied.

Figure 27:
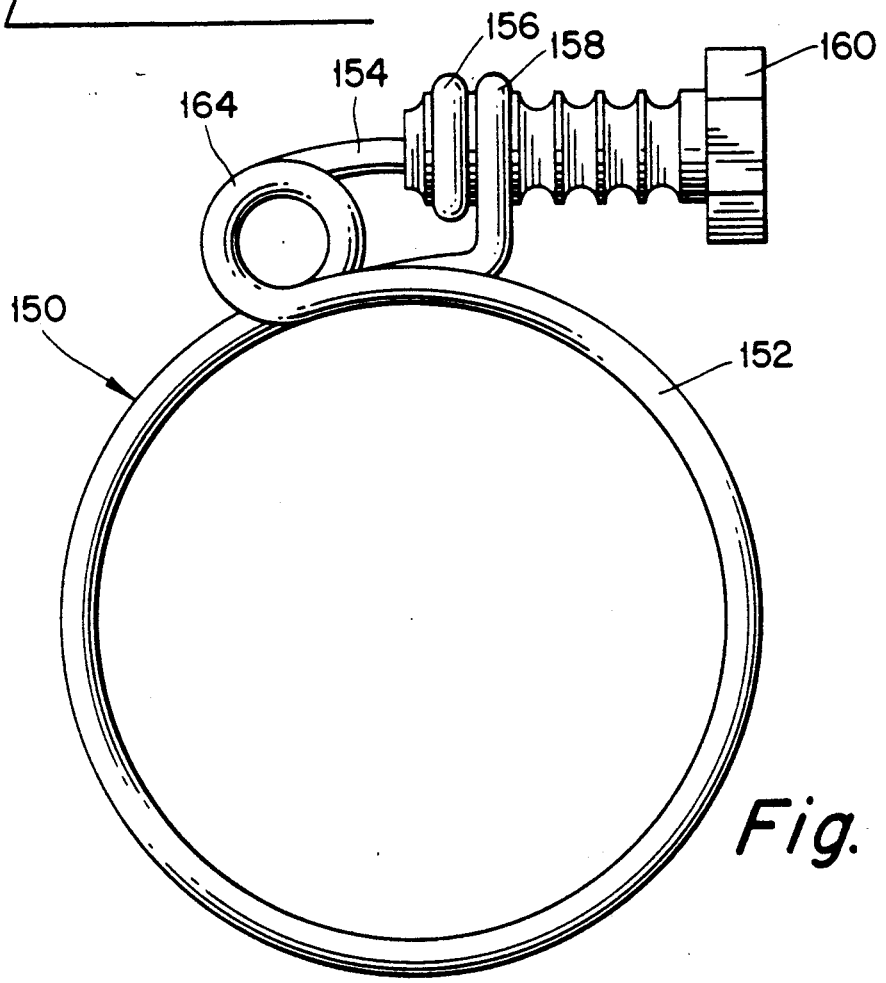
FIG. 27 is a front elevation of a clamping ring in which the hook end an integral coil spring.

Another specially preferred embodiment of the invention is depicted in FIG. 27. In this embodiment, the wire clamping ring 150 has many similar features to those wire clamping rings previously described. More particularly, the hard spring wire is formed into a loop 152, with one end 154 being adapted and oriented to be received in one end of a screw 160. The other end 156 of the wire is formed into a screw-receiving lug 158 with at least one and a half turns that is sized to accommodate the screw 160 having an external thread.

Figure 28:
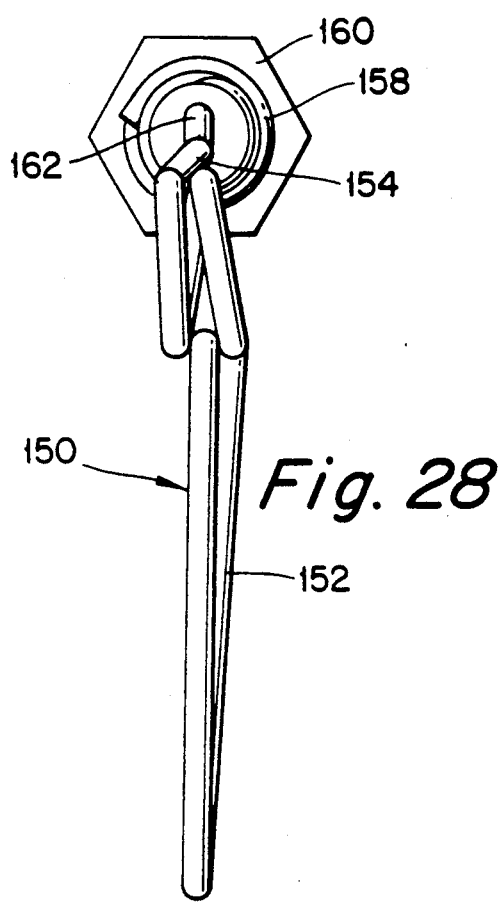
FIG. 28 is a left elevation of the clamping ring of FIG. 27.
Figure 29:
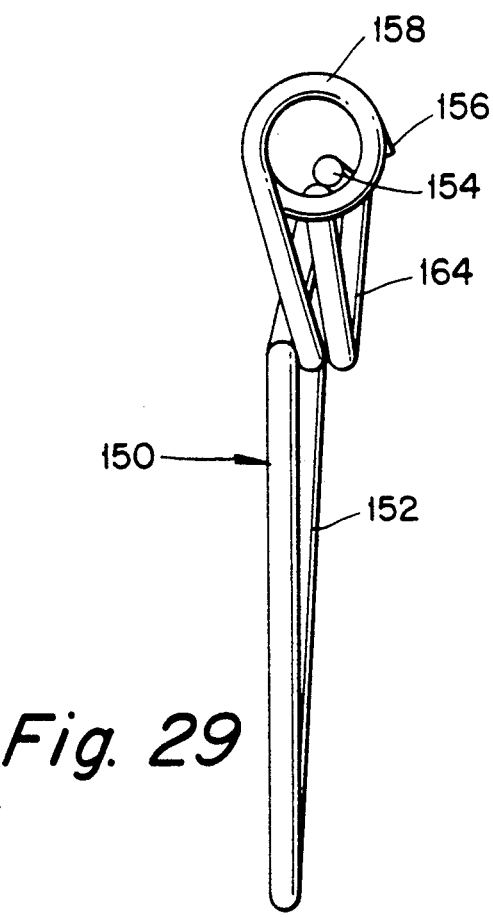
FIG. 29 is a right elevation of the clamping ring of FIG. 27.

As best seen in FIG. 28, the one end 154 of the wire is received in a recess 162 at the distal end of the screw 160. The recess 162 has a non-circular cross section. The one end 154 is formed such that it must be resiliently deflected to reach the centerline or axis of the lug 158. As seen in FIG. 29, the end 154 has an undeflected position which is not only displaced toward the loop from the axis of the lug 158, but is also offset from the plane of the loop. With this arrangement, the non-circular cross section of the recess 162 and the end 154 of the wire cooperate to give a detent to rotation of the screw.

The embodiment of FIG. 27 also includes a torsion spring element 164 between the loop 152 and the first end 154. As best seen in FIG. 29, wire of the loop is formed into this torsion spring by making a coil of at least one and a half turns such that the coil of the torsion spring 164 straddles the wire from the loop 152 which is bent to form the lug 158. Thus, the diameter of the torsion spring 164 is preferably selected so as to be about the distance from the inside of the loop 152 to the inside of the lug 158.

The torsion spring 164 allows the circumferential length of the clamp loops to vary so as to accommodate, for example, thermally induced diameter changes in the item being clamped. Such changes are accommodated without requiring corresponding strain in the clamping wire because the torsion spring 164 can coil more tightly and thus yield to alleviate the strain. Furthermore, the torsion spring 164 acts to resist twisting of the loop 152 that would tend to open the loop. As seen in FIG. 28, with the torsion spring 164 having an axis perpendicular to the plane of the loop 152, the torsion spring 164 urges the overlapping portions of the loop 152 into contact with one another and thus in opposition to any forces that would tend to move the overlapping portions apart.

In FIG. 30, an embodiment of the clamping ring is illustrated in which a two-loop clamp is also provided with torsion springs. More particularly, the hard spring wire of the double loop clamp 170 is formed with a pair of loops 172, 174 and a screw-receiving lug 176 therebetween. The lug is defined by at least one and a half turns of the wire and is generally perpendicular to the loops 172, 174. The free ends 178, 180 of the wire extend from corresponding torsion springs 190, 188. Each torsion spring is also defined by at least one and a half turns of the wire. A screw 182 with an external thread 184 is turned into the lug 176 such that the thread 184 engages the lug 176. The external thread of the screw 182 and the pitch of the lug 176 correspond. The free end of the screw 182 is provided with a recess 186 which is non-circular and which is adapted to receive the free ends 178, 180 of the wire.

Figure 31:
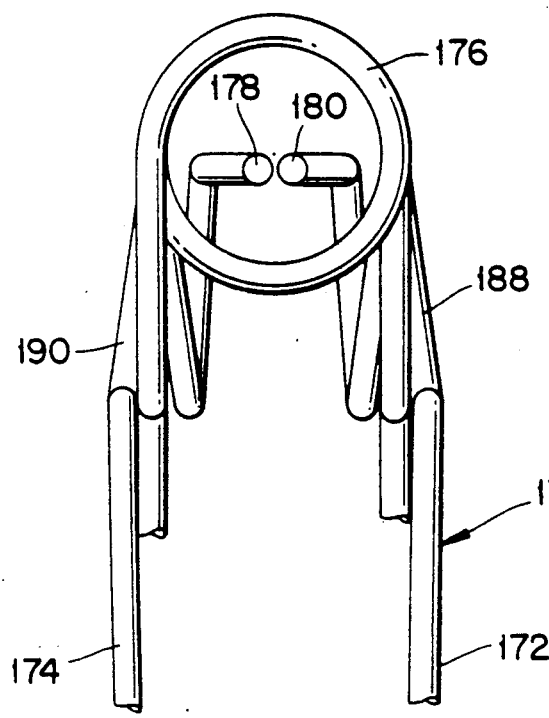
FIG. 31 is a partial right end view of the clamping ring of FIG. 30 with the ends positioned as if the screw were not removed.
Figure 32:
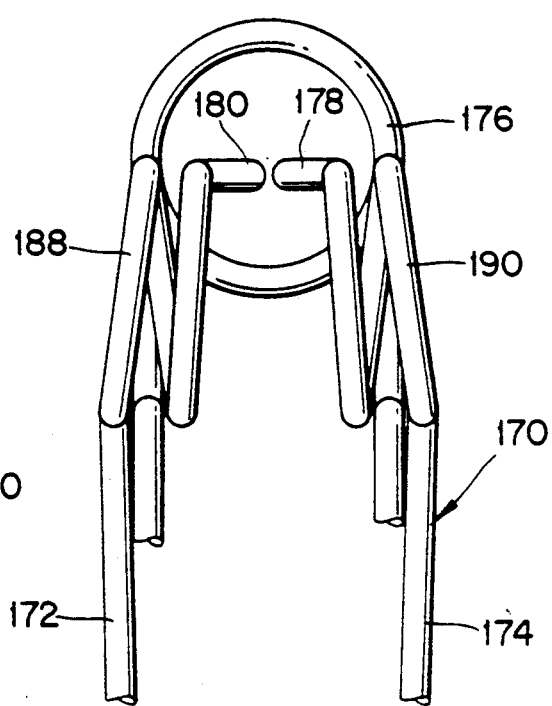
FIG. 32 is a partial left end view of the clamping ring of FIG. 30 with the ends positioned as if the screw were not removed.

As best seen in FIGS. 31 and 32 (where the screw is removed but the free ends 178, 180 of the wire are left in their stressed position), the free ends 178, 180 of the wire are offset from the axis of the lug 176 toward the loops 172, 174 of the clamping ring 170. In addition the free ends 178, 180 are offset from the axis of the lug 176 toward the corresponding loops 172, 174.

As seen in FIG. 32, the free ends 178, 180 of the wire are formed so that they end generally within the confines of the lug 176. This arrangement facilitates assembly of the screw into the lug and engagement of the ends in the screw recess.

Figure 33:
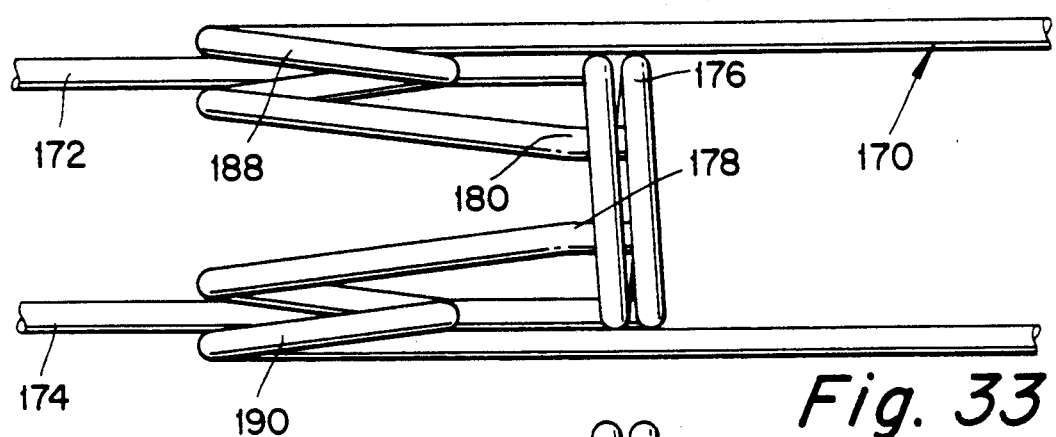
FIG. 33 is a partial top view of the clamping ring of FIG. 30 with the screw removed.
Figure 34:
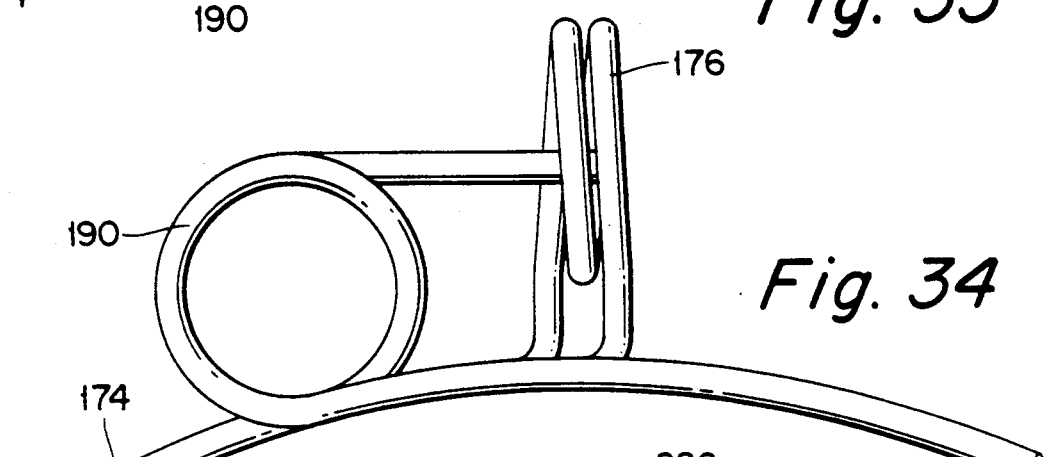
FIG. 34 is a partial front view of the clamping ring of FIG. 30 with the screw removed.

The effect of the presence of the screw is clearly seen when FIGS. 31 and 32 are compared with FIG. 33. It will, for example, be seen that the free ends 180, 178 are farther apart when the screw is removed than they are when the screw is present. Thus, when the screw is present, each of the corresponding torsion springs 188, 190 operates to pull the overlapping portions of the corresponding loop toward one another. In addition, as with the single wire embodiment, the presence of the torsion springs allows the loops 172, 174 to accommodate dimensional changes in the member being clamped without becoming overstressed themselves. And, as with the single wire embodiment, the axis of each torsion spring 188, 190 is perpendicular to the plane of the wire loop 172, 174 and perpendicular to the axis of the lug 176.

Figure 38:
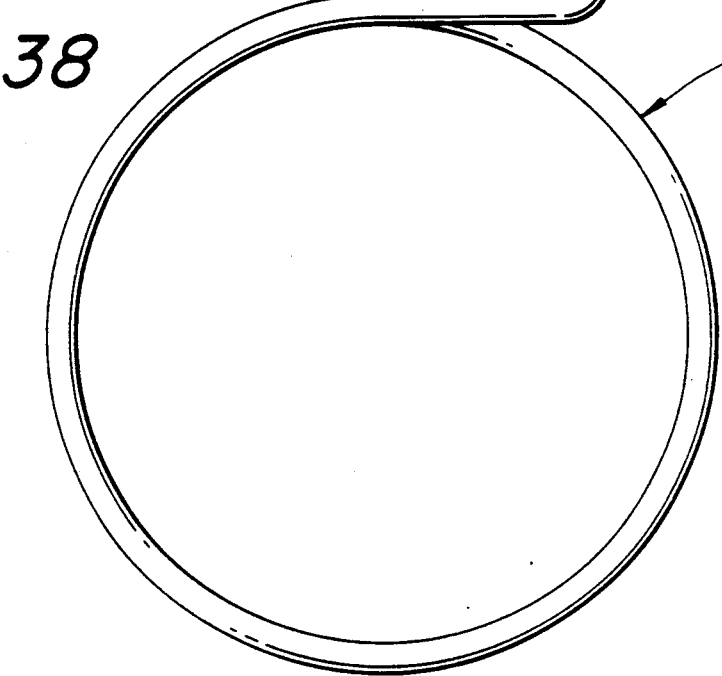
FIG. 38 is an enlarged elevational view of a two loop clamping ring with each loop having a lengthened portion to give torsional resilience.

Turning briefly to FIG. 38, a double wire embodiment of the clamping member, similar to the single loop arrangement of FIG. 23 is shown. In FIG. 38, the double loop clamp 220 has ends 222 that are received in a recess at the end of a screw 228 received by a lug 226 formed in the wire. Each end 222 is provided with a bight 224 that can accommodate dimensional expansions of the clamping wire loops, as discussed in more detail in connection with FIG. 23.

There are various embodiments of the screw used in the clamping device of the present invention that can be used with the single and double wire clamp embodiments discussed above in detail. For example, as seen in FIG. 28, the screw for a single loop clamp may have a recess 162 with a cross section with one dimension approximately the same as the diameter of the spring wire while the perpendicular dimension is two or more times the diameter of the spring wire.

Another embodiment of a suitable screw 200 for a single loop clamp is illustrated in FIG. 37. There, the end of the screw has an opening 202 which is eccentrically positioned relative to the axis of the screw. With either of these screw embodiments, where the end of the wire is displaced from the axis of the screw-receiving lug, the screw, lug, and end of the wire will cooperate to provide a detent to resist rotation of the screw within the lug. In the case of the screw in FIG. 28, there will be two detent positions for each revolution of the screw. In the case of the screw in FIG. 37, there will be only one detent position for each revolution of the screw.

Similarly, with the double loop clamping members, screws can be provided with multiple detent positions. In FIG. 35, the screw 204 has a recess 206 in the end thereof which is adapted to receive two wire ends 208, 210. The recess 206 has a first width which is at least as great as twice the diameter of a wire end. The recess 206 has a second with which is greater then the first width. As a result, the recess 206 has a minimum width that is sufficient to allow the two wire ends to pass when the screw 204 rotates, but there is a detent position for each wire end 208, 210 twice during each revolution of the screw 204.

In the embodiment of FIG. 36, a screw 212 has a recess 214 with three lobes. The recess 214 is defined by arcuate surfaces in cross section. The two wire ends 216, 218 are biased away from the center of the recess. Accordingly, for each revolution of the screw 212, there are three detent positions.

Tightening devices of the type described above offer considerable advantages. For example, the devices only require two pieces which permits economic production and simple assembly. Moreover, if it is desired to change the size of the loop, it is only necessary to change the wire size. Furthermore, it is possible to use the screws designed for double loop clamps with a single loop clamp, as may be desired if multiple detents per revolution are desired.

With the free end of the hook lying inside and going through the lug, the end of the hook is easily inserted into the cooperating hole in the end of the screw when the screw is inserted into the lug.

The selection of hard spring wire as the material for the loop member is also important. That material selection makes it possible to form the tightening ring so that the assembled ring has a predetermined tension which resists the free end of the hook from jumping out of the hole in the screw before the screw is tightened. Furthermore, the hard spring wire provides excellent form stability to the tightening ring.

The angle between the tightening ring plane and the hook plane gives a tension on each end of the ring which is oriented to keep these two ends together. In addition, the shape causes a substantially axial flow of forces in the tightening ring.

The depth of the hole in the end of the screw is also an advantage. That depth makes it possible to insert the end of the hook with its predetermined length so that the end is guided into the hole. Likewise, as noted, the noncircular cross section of the hole along with the inclined hook end creates a detent which inhibits turning of the screw.

The configuration of the end of the spring wire can also be selected to considerable advantage. In applications where the member to be clamped will, for example, expand and contract in response to thermal variations, the end or ends of the clamp wire can be provided with a simple bight to accommodate those variations without introducing destructive stresses into the clamp. Alternatively, the end or ends of the clamp wire can be formed with additional torsion springs that will not only accommodate thermal variations and the like in the member being clamped, but will also provide forces urging the overlapping portions of the loops together to thereby resist twisting movements that would otherwise open the clamp.

The screw itself can be made in any simple manner such as by injection molding, if desired.

In addition, the screw can be provided with a recess that will give one, two, three, or more detent positions for each revolution of the screw.

It will now be apparent that a new and useful hose clamp has been disclosed and described which overcomes problems of the type present in the prior art. Moreover, it will be apparent to those skilled in the art that there are numerous modifications, variations, substitutions, and equivalents for features of the present invention which do not materially depart from the spirit and scope of the invention. Accordingly, it is expressly intended that all such modifications, variations, substitutions, and equivalents which fall within the spirit and scope of the invention as defined by the appended claims be embraced thereby.

What is claimed is:

1. A hose clamp for fastening a hose to a connecting piece having an axis comprising:

a tightening ring formed from hard spring wire, a portion of the tightening ring surrounding the hose through 360° at a clamping location and defining a clamping plane generally perpendicular to the connecting piece axis, having a pair of ends which overlap, each end having an outwardly directed bend;

a portion of the ring being formed as a threaded lug; and at least one threaded clamping element cooperating with the ends of said tightening ring, being positioned between the ends of the tightening ring essentially parallel to the overlap of said ends, the clamping element acting in compression, the clamping element having an external thread which is received by the threaded lug, and an end portion which cooperates with the end having an outwardly directed bend, the clamping element releasably engaging the outwardly directed bend with a plug-in type connection, being a detent against turning of the clamping element, and acting on the ends of the tightening ring at an angle to the clamping plane.

2. A hose clamp according to claim 1, wherein the tightening ring is in the form of a double wire tightening ring, wherein the portion forming the screw receiving lug is formed between the ends of a single piece of wire.

3. A hose clamp according to claim 1, wherein the clamping element is a screw acting on both ends of the tightening ring and having a free end, wherein one end of the tightening ring is in the form of an outwardly bent threaded lug for receiving the screw, the screw being received therein, the threaded lug being wound of the wire of the tightening ring and having preferably at least 1½ turns, and wherein the other end of the tightening ring is cooperates with the free end of the screw to make a plug-in connection.

4. A hose clamp according to claim 3, wherein the tightening ring is in the form of a double wire tightening ring, wherein one length of wire is bent in the shape of a hair pin and one end of the tightening ring is formed by said hair pin bend, wherein the hair pin bend of the double wire tightening ring has the form of the threaded lug and wherein the winding of the threaded lug is disposed between the two wires of the double wire tightening ring.

5. A hose clamp according to claim 3, wherein the free end of the screw has a bore, wherein the outwardly directed bend is shaped as a hook, and wherein the plug-in connection is established by introducing the hook of the wire tightening ring into the bore provided in the free end of the screw.

6. A hose clamp for fastening a hose to a connecting piece comprising:

a tightening ring of hard spring wire with a predetermined diameter, the ring surrounding the hose at a clamping position through at least 360°, having a pair of outwardly bent ends which overlap, and where the tightening ring defines a first two-dimensional plane;

one outwardly bent end being formed as a threaded lug to receive a screw, the lug being formed as at least 1½ turns of the spring wire;

the other outwardly bent end being formed as a U-shaped hook with a free end having a length of at least three times the diameter of the spring wire, the U-shaped hook lying in a second two-dimensional plane forming a small angle with the first plane, the angle corresponding generally to the pitch of the thread so that the free end of the hook rests inside the lug when the tightening ring is in a relaxed condition; and a screw received by the lug, acting on both ends of the tightening ring, having a thread which corresponds to the thread defined by the lug, having a screw end with a longitudinal hole, the longitudinal hole having a noncircular cross section and cooperating with the free end of the hook to make a detent against rotation of the screw, the length of the hole being at least three times the wire diameter and the minimum width of the hole being at least equal to the wire diameter.

7. The hose clamp of claim 6 wherein the small angle is about 5°.

8. The hose clamp of claim 7 wherein the portion of the ring attached to the threaded lug is located between turns of the torsion spring.

9. The hose clamp of claim 6 wherein the wire ring forms two tightening rings, the threaded lug being formed between the two rings, and hooks being provided at each end of the wire.

10. The hose clamp of claim 6, wherein a first plane is defined by the ring and wherein the hook end defines a second plane disposed at a small angle to the first plane so that the hook end is nearly concentric to the lug.

11. A hose clamp for fastening a hose to a supporting member comprising:

a ring of hard spring wire with a pair of ends, formed into a loop with overlapping portions and the ends of the wire, and the wire being bent outwardly near the ends thereof;

one end of the wire being formed as a threaded lug with at least one and a half turns of wire;

the other end of the wire being formed as a hook;

a screw having an external thread corresponding to the thread defined by the threaded lug, and having a longitudinal hole; and the hook of the wire being received by the longitudinal hole so as to define a plug-in connection, which functions as a detent against rotation of the screw.

12. The hose clamp of claim 11 wherein the cross section of the longitudinal hole is non-circular, wherein the wire has a diameter, and wherein the width of the longitudinal hole is at least equal to the diameter of the wire.

13. A hose clamp for fastening a hose to a supporting member comprising:

a ring of hard spring wire with a pair of ends, formed into a loop with overlapping portions and the ends of the wire, and the wire being bent outwardly near the ends thereof;

one end of the wire being formed as a threaded lug with at least one and a half turns of wire;

the other end of the wire being formed as a hook;

a screw having an external thread corresponding t the thread defined by the threaded lug, and having a longitudinal hole; and the hook of the wire being received by the longitudinal hole so as to define a plug-in connection, wherein the ring of hard wire defines a plane, and wherein the turns of the threaded lug are generally perpendicular to the plane of the ring so that the screw is inclined at a small angle to the plane to force the overlapping portions of the clamp toward one another.

14. A hose clamp for fastening a hose to a supporting member comprising:

a ring of hard spring wire with a pair of ends, formed into a loop with overlapping portions and the ends of the wire, and the wire being bent outwardly near the ends thereof;

one end of the wire being formed as a threaded lug with at least one and a half turns of wire;

the other end of the wire being formed as a hook;

a screw having an external thread corresponding to the thread defined by the threaded lug, and having a longitudinal hole; and the hook of the wire being received by the longitudinal hole so as to define a plug-in connection, wherein the hook end includes a torsion spring formed by the outward bend being given at least one and a half turns.

15. A hose clamp for fastening a hose to a supporting member comprising:

a double ring member formed from a single length of hard spring wire, having a pair of ends, and having overlapping parts of the rings bent outwardly near their ends;

a central portion of the wire being formed as a threaded lug;

each end of the ring member being formed as a hook;

an externally threaded screw, received in the threaded lug, and having a longitudinal hole; and the hooks of the ends being received in the longitudinal hole so as to define a plug-in type connection.

16. The hose clamp of claim 15 wherein the longitudinal hole has a non-circular cross section.

17. The hose clamp of claim 15 wherein a plane of symmetry is defined by the two clamp parts, wherein the end portions of the ring adjacent to the threaded lug are bent from the plane of symmetry, and wherein corresponding parts of the ring near the bent portions of the ring pass the bent portions outwardly relative to the plane of symmetry.

18. The hose clamp of claim 17 wherein the hook ends are bent a second time so that the configuration is symmetrical with respect to the screw and with respect to the plane of symmetry.

19. The hose clamp of claim 17 wherein the hook ends are bent at an angle of about 5°.

20. The hose clamp of claim 15 wherein each hook end is provided with a torsion spring, each torsion spring being formed by a corresponding one of the outward bends of the ring, and each torsion spring having at least one and a half turns.

21. The hose clamp of claim 20 wherein the portions of the wire connected to the threaded lug are located between the turns of the wire in the torsion springs.

* * * * *